US008862637B2

(12) United States Patent
Fachat

(10) Patent No.: US 8,862,637 B2
(45) Date of Patent: Oct. 14, 2014

(54) GENERATING DATA ACCESS OPERATIONS BASED ON A DATA MODEL USING A DATA SERVICES MODEL

(75) Inventor: Andre Fachat, Schriesheim (DE)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/193,972

(22) Filed: Aug. 19, 2008

(65) Prior Publication Data

US 2009/0094577 A1    Apr. 9, 2009

(30) Foreign Application Priority Data

Oct. 9, 2007   (EP) ..................................... 07118128

(51) Int. Cl.
*G06F 17/30*     (2006.01)
*G06F 9/44*      (2006.01)
(52) U.S. Cl.
CPC .................................. *G06F 9/4435* (2013.01); *G06F 8/35* (2013.01)
USPC ........................................................ 707/810
(58) Field of Classification Search
USPC .......................................... 707/999.101, 102
See application file for complete search history.

(56) References Cited

U.S. PATENT DOCUMENTS

| | | | | |
|---|---|---|---|---|
| 6,473,794 | B1 * | 10/2002 | Guheen et al. ................. | 709/223 |
| 7,054,877 | B2 * | 5/2006 | Dettinger et al. .............. | 707/718 |
| 7,424,473 | B2 * | 9/2008 | Orton et al. ............................ | 1/1 |
| 7,792,878 | B2 * | 9/2010 | Dettinger et al. .............. | 707/810 |
| 7,860,902 | B2 * | 12/2010 | Brendle et al. ................. | 707/809 |
| 7,953,740 | B1 * | 5/2011 | Vadon et al. ................... | 707/751 |
| 8,204,799 | B1 * | 6/2012 | Murray et al. ............. | 705/26.81 |
| 2003/0061256 | A1 * | 3/2003 | Mathews et al. .............. | 709/101 |
| 2004/0059746 | A1 * | 3/2004 | Error et al. ..................... | 707/102 |
| 2005/0039033 | A1 * | 2/2005 | Meyers et al. ................. | 713/193 |
| 2006/0179065 | A1 * | 8/2006 | Xu ................................. | 707/100 |
| 2006/0277203 | A1 * | 12/2006 | Uittenbogaard .............. | 707/100 |
| 2007/0226810 | A1 * | 9/2007 | Hotti ............................... | 726/30 |

OTHER PUBLICATIONS

"Take Advantage of the Benefits of Loosely Coupled Web Services," Jeff Hanson, Dec. 11, 2002, http://articles.techrepublic.com.com/5100-10878_11-1050425.html.
"OASIS Reference Model for Service Oriented Architecture1.0," Organization for the Advancement of Structured Information Standards (OASIS); Aug. 2, 2006, pp. 1-31.
"WSO2 Web Services Application Server (WSO2 WSAS) 2.0 Release Notes," Jul. 23, 2007, http://wso2.org/project/wsas/java/2.0/release-notes.html.
"BEA AquaLogic Data Services Platform—Data Services Developer's Guide," Sections 4 and 5, Version 2.5, Document Date: Jun. 2005; Revised: Sep. 2006.
Kaye, Doug, "Loosely coupled: the missing pieces of web services", RDS Press, Marin County California, 2003 (no further date information available).
"BEA AquaLogic Data Services Platform 3.2," BEA Systems Inc., Apr. 18, 2008, pp. 1-3.

* cited by examiner

*Primary Examiner* — Bai D. Vu
(74) *Attorney, Agent, or Firm* — Ronald Kaschak, Esq.; Blanche E. Schiller, Esq.; Heslin Rothenberg Farley & Mesiti P.C.

(57) ABSTRACT

Data access operations can be generated based on a data model, allowing an efficient implementation of accessing a data store storing persistent data. A description of the data model is received, the description including transactions on data objects and at least one interrelationship within the transactions. The transactions are converted into data access operations in accordance with a protocol defined by a data store, the conversion taking into account the at least one interrelationship.

20 Claims, 7 Drawing Sheets

GENERATING DATA ACCESS OPERATIONS BASED ON A DATA MODEL USING A DATA SERVICES MODEL

CROSS-REFERENCE TO RELATED APPLICATIONS

This application claims priority from European Patent Application No. 07118128.3, filed with the European Patent Office on Oct. 9, 2007, entitled "Method for Generating Data Access Operations Based on a Data Model Using a Data Services Model," by Andre Fachat, the entirety of which is hereby incorporated herein by reference.

FIELD OF THE INVENTION

The invention relates, in general, to data access operations, and in particular, to generating data access operations based on a data model.

BACKGROUND OF THE INVENTION

A service-oriented architecture (SOA) is an architecture that uses loosely coupled services to support the requirements of business processes and users. By a service is meant a mechanism to enable access to one or more capabilities, where the access is provided using a prescribed interface and is exercised consistent with constraints and policies as specified by a service description. By loose coupling is meant a resilient relationship between two or more services with some kind of exchange relationship as described in Doug Kaye, "Loosely coupled: the missing pieces of web services", RDS Press, Marin County California, 2003. The "OASIS Reference Model for Service Oriented Architecture 1.0" published by the Organization for the Advancement of Structured Information Standards (OASIS) at "http://www.oasis-open.org/committees/tc_home.php?wg_abbrev=soa-rm" describes a reference model of a SOA.

FIG. 1 shows, as an example, a block diagram of an electronic commerce application 100 in accordance with a SOA, illustrating a typical access pattern for a virtual shopping cart. In step 110, a controller 101 requests the contents of a shopping cart 106, for example, in response to a user query to view contents of the shopping cart or as a part of making a purchase. In step 111, the controller 101 receives the list of items contained in the cart 106, for example, from an underlying database. In step 112, the controller 101 processes the list of items, typically through the consolidation 102 of multiple items identifying the same article into a single item of the respective accumulated quantity. In step 113, the controller 101 requests the articles identified by the consolidated shopping cart items and receives the articles in step 114. Finally, in step 115, the controller performs a match 103 between the retrieved articles and the shopping cart items. Here, access to the shopping cart 106 is managed by means of a cart service 104, whereas access to the catalog 107 is managed by means of a catalog service 105.

When defining the services of a SOA, storage and information service interfaces are commonly modeled in the same fashion and using the same tools and techniques as other services. This conventional approach does not take into account the specific requirements of storage and information services. In particular, the resulting service definition typically does not include a persistent data model, that is, an abstract model that describes how data is represented and used which outlives the execution of the service that created it. The state-of-the-art service definition only defines the interface between components. It does not comprise the persistent data model underlying a component implementing a service using persistent data.

An example of a conventional persistent data meta-model, i.e. a model for modeling persistent data, is given in FIG. 2. The meta-model 200 comprises the object types "Relation" 201, "Object" 202, and "Attribute" 203, which are described in the following.

An object 202 contains the name of the object (i.e. a representation of the table name in a conventional data store). An attribute 203 is related to the object 202, and contains the name and type of the attribute 203. It further comprises information on whether the attribute 203 is part of the primary key of the object 202. The primary key uniquely identifies the object 202 in the persistent data store and consists of the set of attributes that are marked as part of the primary key.

A relation 201 defines a foreign key relationship between objects 202. The relationship is directed, i.e. when a first object has a foreign key relationship to a second object, the first object has attributes that contain the value of the primary key of the second object. Using the foreign key relationship, the attributes of the first object containing the primary key of the second object may be automatically generated and thus not explicitly defined in the set of attributes for the first object.

Since it does not include the persistent data model, the state-of-the-art service model does not allow the efficient generation of an implementation for the service it defines. This can result in a mismatch between the service interface and the requirements of the information architecture and lead to performance problems in the actual implementation of the service.

SUMMARY OF THE INVENTION

A first aspect of the invention provides a computerized method for generating data access operations based on a data model. The method includes, for instance, receiving a description of the data model, the description including transactions on data objects and at least one interrelationship within the transactions; and converting the transactions into data access operations in accordance with a protocol defined by a data store, the conversion taking into account the at least one interrelationship.

A method according to the invention may include providing a set of allowable transactions for building the data model and a set of allowable interrelationships between the allowable transactions. The description may then include selected allowable transactions from the set of allowable transactions and selected interrelationships between the selected transactions from the set of allowable interrelationships.

The set of allowable transactions may include at least one of the following: a transaction for creating an object in the data store, a transaction for reading an object in the data store, a transaction for updating an object in the data store, and a transaction for deleting an object from the data store.

The method may further include generating program code based on the data model and the data access operations.

As another option, a method according to the invention may include optimizing the data access operations for the data store based on at least one of the following: a measure of processing duration for at least one of the transactions, and a measure of workload imposed on the data store by at least one of the transactions.

The method may further include generating a data definition expressed by means of a data definition language, the data definition based on at least one of the following: the data model, and the data access operations.

The data store may include at least one of the following: a relational database management system, a file containing Extensible Markup Language, and a resource described using the Resource Description Framework.

The description may be based on Extensible Markup Language.

As another option, the method may include providing the description by means of a graphical user interface.

A second aspect of the invention provides a computer program product comprising a computer useable medium having a computer readable program, wherein the computer readable program when executed on a computer causes the computer to receive a description of a data model, the description including transactions on data objects and at least one interrelationship within the transactions; and convert the transactions into data access operations in accordance with a protocol defined by a data store, the conversion taking into account the at least one interrelationship.

As another option, the computer program product may comprise a compiler for generating program code based on the data model and the data access operations.

A third aspect of the invention provides a device for generating program code from a data model. The device includes, for instance, means for storing a description of the data model, the description including transactions on data objects and at least one interrelationship within the transactions; and means for converting the transactions into data access operations in accordance with a protocol defined by a data store, the means for converting being responsive to the at least one interrelationship.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The invention that is presented here aims to provide a data services model that can be used as a basis for the generation of an efficient implementation of accessing a data store storing persistent data.

Embodiments of the invention are applicable in any computer program that implements data services based on a data store. In the following description, a relational database is used as an example of a persistent data store. Further examples of persistent data stores are files stored on magnetic or optical disk, magnetic tape or other storage media. Furthermore, although an example of an electronic commerce system is used that is based on a SOA, the application of embodiments of the invention is not limited to a specific software architecture.

Figure 3:
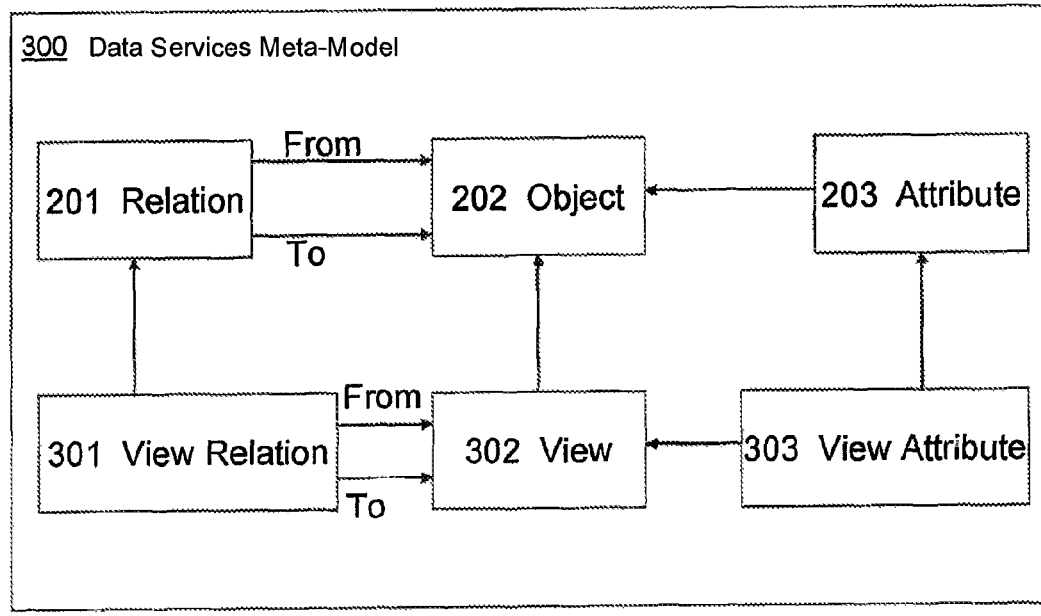
FIG. 3 shows, as an example, a data services meta-model according to an embodiment of the invention.

The proposed approach is elucidated by reference to an embodiment in conjunction with FIG. 3, where a view (i.e. a read operation) is used as an example of a transaction on a data object. This figure shows, as an example, a data services meta-model 300 according to an embodiment of the invention. For each object 202, a data services model may define one or several views 302. A view attribute 303 of the view 302 may define which attributes of the object 202 are to be read upon retrieving the object. In another context, the view attribute 303 may define which attributes are to be used as selection criteria for retrieving an object 202. If multiple views 302 are defined for an object 202, the use of different view attributes 303 would thus allow specifying distinct selection criteria and retrieval attributes for each of these views.

In the context of a relational database management system, the view 302 may be a virtual or logical database table composed of the result set of a database query, for example, initiated by a user against the object 202. The database attributes to which the query pertains would then typically be controlled by the view attribute 303. For example, an embodiment of the invention may use these attributes in the SELECT clause of an SQL statement for retrieving the object. Alternatively, an embodiment may use these attributes in the WHERE clause of an SQL statement for retrieving the object.

A view relation 301 of the view 302 may define an additional view to include upon retrieving the view 302. Typically, the view relation 301 would comprise a reference to a relation 201, thus being based on the foreign key relationship defined by that relation 201. The foreign key relationship is directed, i.e. when a first object has a foreign key relationship to a second object, the first object has attributes that contain the value of the primary key of the second object. The view relation 301 is directed as well. It thus defines that when a first view is read, that a second view is included in the result of the view, but not that when the second view is read that the first view is included. As both, the foreign key relationship and the view relation are directed, these relation can be in parallel or antiparallel.

An embodiment of the invention may use the relation 201 referenced by the view relation 301 for generating the WHERE clause of an SQL statement. Depending on the direction of the view relation and the foreign key relationship, different SQL statements may be generated.

Figure 4:
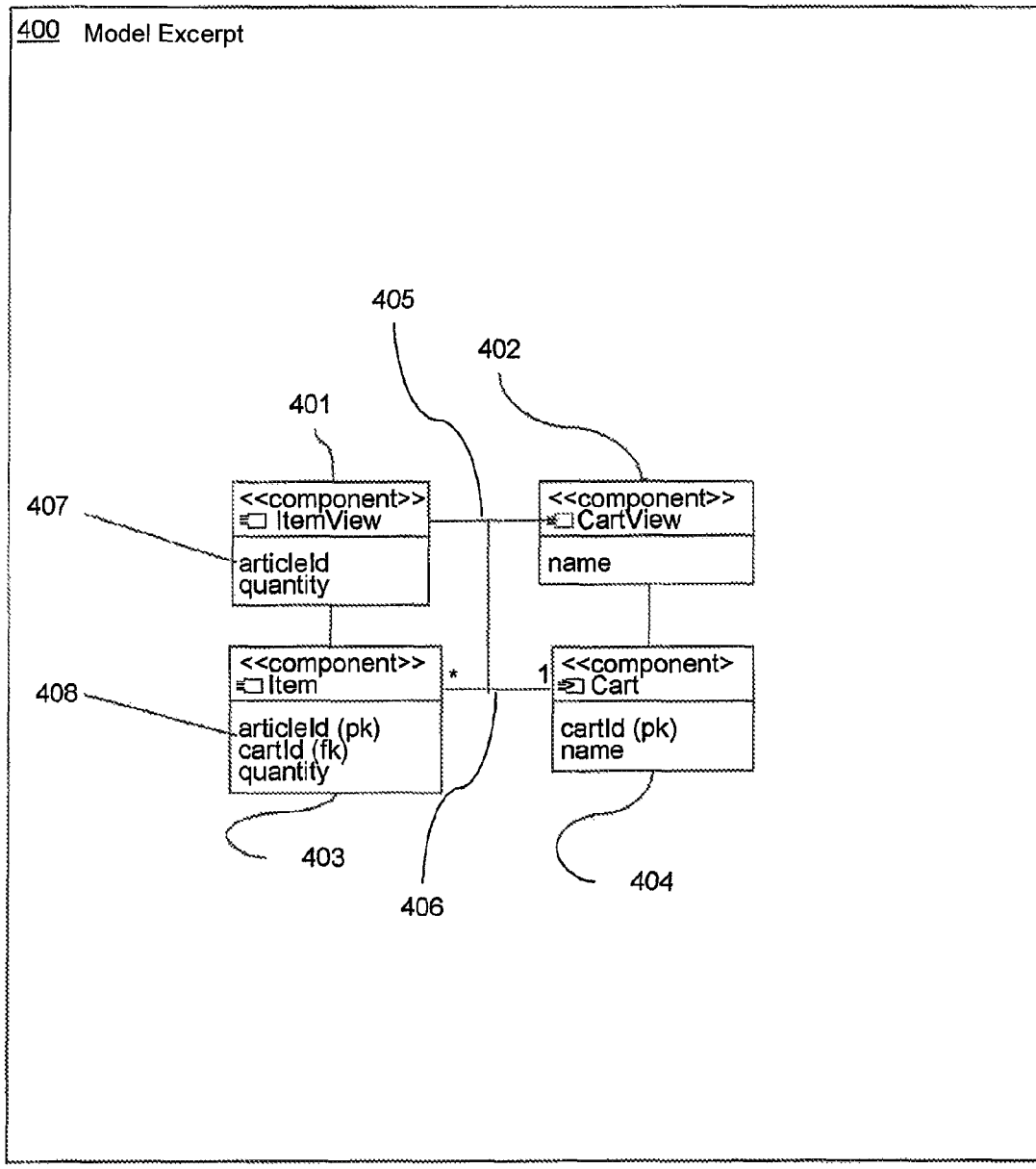
FIG. 4 shows, as an example, an excerpt of a data services model according to an embodiment of the invention.

FIG. 4 shows, as an example, an excerpt of a data services model of an electronic commerce system, expressed using the Unified Modeling Language (UML). The model excerpt 400 comprises two views: an item view 401 (according to a view meta model 302) showing attributes of an item 403 (according to an object meta model 202), and a cart view 402 showing the contents of a virtual shopping cart 404. The cart and item objects have foreign key relationship 406 (according to the relation meta model 201). View relation 405 requires view 401 to be included upon retrieving view 402, for example, by means of a foreign key relationship between corresponding cart and item tables in a relational database. When the system uses view 402, for example, to access the contents of virtual shopping cart 404, view relation 405 would cause view 401 to be included in a resulting query against the database, resulting in information on item 403 being retrieved along with the shopping cart contents. On the database level, view relation 405 reflects the foreign key relationship 406 where the item objects constituting the cart contents each having an attribute containing the value of the primary key of the corresponding cart object. The object attributes 408 (according to the attribute meta model 203) define the attributes of the objects. The view attributes 407 (according to the view attribute meta model 303) define which of the object attributes are to be included in the view result.

In a result of the embodiment of the invention, the generated code would execute first a query to retrieve the shopping cart object, and then a second query to retrieve all the item objects for that shopping cart, following the foreign key relationship 406 by definition of the view relation 405.

The object model containing the cart 404, item 403, attributes 408 and the corresponding foreign key relationship 406 can be defined by using existing tools in accordance with prior art.

The view model containing the cart view 402, item view 401, view attributes 407 and the corresponding view relation 405 could be defined using existing, generic tools. These tools, however, lack the semantic interpretation of the view components required to convert the view transaction into data access operations while taking into account the view interrelationship 405 or to generate the respective code.

Figure 5:
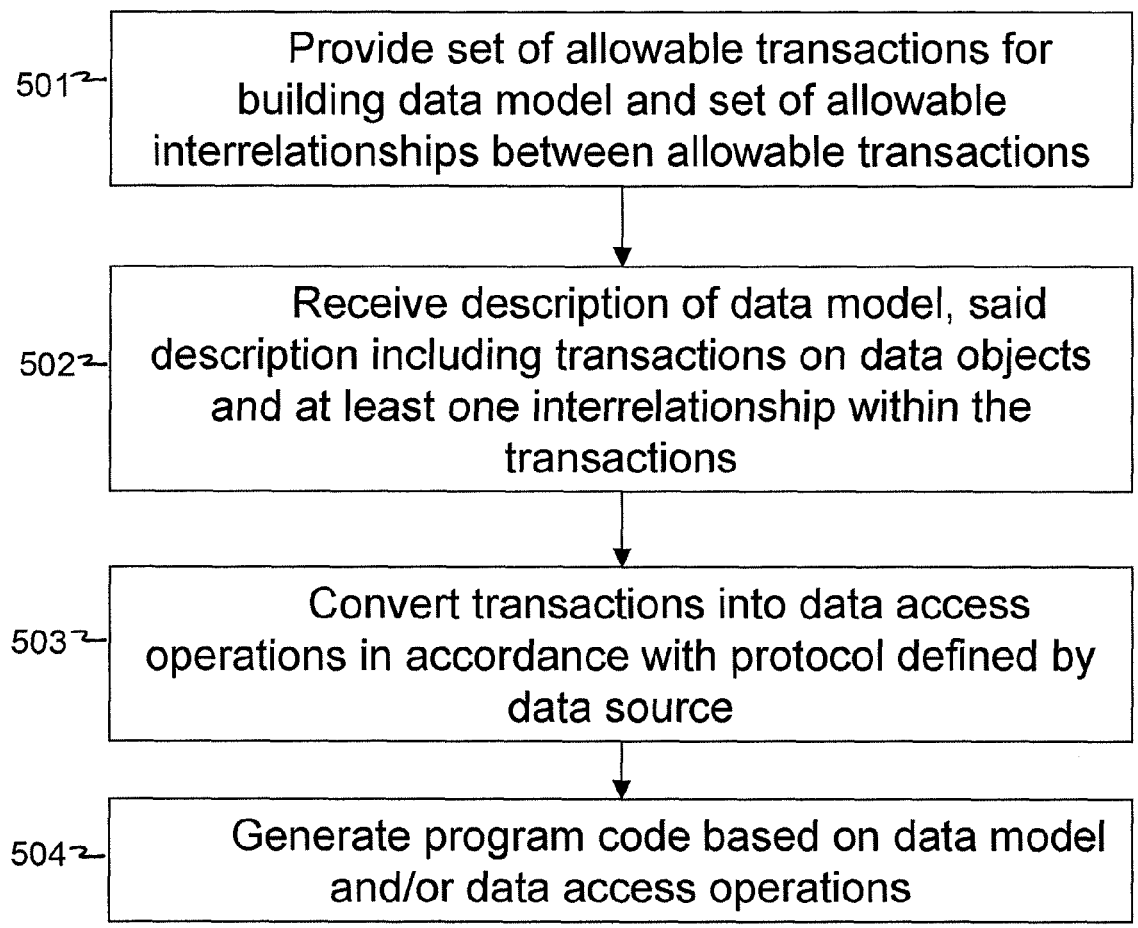
FIG. 5 shows, as an example, a flowchart of a process according to an embodiment of the invention.

FIG. 5 shows, as an example, a flowchart of a process according to an embodiment of the invention. In an optional step 501, the process of FIG. 5 provides a set of allowable transactions for building a data model and a set of allowable interrelationships between the allowable transactions. An embodiment of the invention may comprise a graphical user interface for providing a selection of transactions, for example, as graphical elements, which would then serve the user as building blocks for assembling a graphical representation of the data model. Alternatively, an embodiment may define a textual representation to describe the data model, for example, based on Extensible Markup Language (XML). Allowable transactions may typically include the reading, creation, update, and deletion of objects, with reading, creating or updating with possibly different sets of object attributes as allowed by the data model. Examples of objects are database records or resources according to the Resource Description Framework (RDF) specified by the World Wide Web Consortium (W3C).

By an interrelationship is meant a logical association between at least two transactions. Examples of interrelationships would be the view relation 405 (according to meta model view definition 301), defining an interconnection or interdependence between the read or view transactions forming their endpoints. As discussed above, a view relation is directed. Other types of interrelationships may be undirected, meaning their endpoints may be mutually interchangeable. The given examples of interrelationships involve a logical association of two transactions of the same type, embodiments of the invention are applicable also for logical associations between different transaction types.

A first example of an allowable transaction is the reading of attributes from a single object or multiple objects of the same type according to selection criteria, typically following foreign key relationships to other objects and reading attributes from the objects related to the original object. An embodiment of the invention allows following these relationships recursively. A data services model may also describe attribute modifiers or reporting functions such as the mathematical sum, maximum or minimum of multiple values. These modifiers or functions may be contained in the definition of the read transaction itself, or specified by additional means provided by an embodiment of the invention. A specific example of a read transaction could be the retrieval of the contents of a virtual shopping cart in an electronic commerce system. In a relational database management system, a read transaction comprising one or multiple objects would typically be implemented by means of one or multiple SQL statements SELECT.

A second example of an allowable transaction is the creation of objects in a persistent data store, wherein the model describes which optional attributes to fill and which relationships to follow to create other objects. The model also describes whether insertions need to be performed in batch mode. The model also describes which attributes are automatically generated. In a relational database management system, a create transaction would typically be implemented by means of the SQL statement INSERT.

A third example of an allowable transaction is the update of objects in the persistent data store, wherein the model describes which attributes from which objects to update and which relationships to follow to update attributes in other objects. The model also describes whether the original (unmodified) objects are to be saved in a history table. In a relational database management system, an update transaction would typically be implemented by means of the SQL statement UPDATE.

A fourth example of an allowable transaction is the deletion of objects in the persistent data store, wherein the model describes which objects to delete and allows following foreign key relationships. In a relational database management system, a delete transaction would typically be implemented by means of the SQL statement DELETE.

Although fully specified programming languages like SQL allow for improved flexibility and expressional power, they impose high education demands on their programmers. Limiting the set of allowable transactions for building a data services model reduces the technical education level required for operating an embodiment of the invention.

In step 502, the process of FIG. 5 receives a description of the data model, the description including transactions on data objects and at least one interrelationship within the transactions. The included interrelationships may, for example, define which additional objects need to be retrieved when a certain object is requested, thus modelling transactions across multiple types of objects.

The description of step 502 may include multiple similar transactions of any type on any set of objects, each with a set of attributes and a different set of foreign key relationships to follow. As an example, the data services model may define multiple read transactions on the same object, including a first transaction with a small set of attributes and a second transaction with more attributes and additional interrelationships.

Optionally, the data services model of step 502 may specify a locking strategy for objects to be accessed by the transactions. By locking is meant a synchronization mechanism for enforcing limits on access to the object in an environment where there are multiple threads of execution. For example, an embodiment of the invention may implement optimistic concurrency control (OCC, commonly referred to as "optimistic locking") by means of a lock counter in a database table and a database trigger for incrementing the counter. By a database trigger is meant procedural code that is automatically executed in response to any change to the table.

Optionally, the data services model may specify whether a history of objects in a database is required. An embodiment of the invention may automatically generate a history table with the same attributes as the original table, the history table comprising an additional column for storing the date when an entry was created. A database trigger may be generated for copying a database row to the history table in response to a change to that row. Optionally, the data services model may specify an expiration interval for the history. An embodiment of the invention may make use of this interval to generate a job, that is, a scheduled and/or automated task, for removing outdated history entries.

Optionally, the data services model may specify an expected database table size and change frequency. As an example, the size may be defined by the expected number of total rows of a table, whereas the change frequency may be defined by the number of rows changed in a given time interval. An embodiment of the invention may make use of these values for optimizing tablespace allocation in a relational database.

Optionally, the data services model may specify sample data for generating test data sets.

Optionally, the data services model may specify column cardinality, i.e. the estimated number of different values in a database column. An embodiment of the invention may use this information for creating hints for the partitioning of large databases. By partitioning is meant the division of a logical database or its constituting elements into distinct independent parts.

Optionally, the data services model may specify a character set for storing character data in a database. An embodiment of the invention may use this information for calculating the length of character fields. For example, the American Standard Code for Information Interchange (ASCII) uses patterns of seven binary digits to represent each character, whereas the 8-bit UCS/Unicode Transformation Format (UTF-8) uses one to four bytes for encoding a character.

Additionally, the description of the data services model may include conditions which have to be fulfilled before a transaction is allowed.

Typically, the data services model is described on the requirements level rather than on the implementation level of the transactions defined by it.

In step 503, based on the interrelationships, the process of FIG. 5 converts the transactions into data access operations in accordance with a protocol defined by a data store. Typically, these data access operations would be optimized for the given data store. For example, the transactions may be converted into a sequence of operations that yields minimum response time, or that imposes the least workload on a database. Depending on their semantics, the interrelationships provided in step 501 may impose specific requirements on the generated operations, or they may cause additional operations to be generated, as in the case of a view relation.

In an optional step 504, the process of FIG. 5 generates program code based on the data model and the data access operations. An embodiment of the invention may provide a compiler or similar system to generate this program code from the data services model described in step 502. The generated code thus effectively implements the transactions defined by the data services model of step 502.

As described above, the data services model may define a view relation that when a first view is read, a second view is read from the database as well. Similarly the model may define a view relation that when reading the second view, a third view is to be read from the database as well, and so on. Thus, in one embodiment of the invention, step 504 generates code that follows the view relations recursively, to implement the recursive relations of the views.

Additionally, the model may define, for each view, select criteria as described above. Thus when calling the service to read a first view that includes a second view, the service is to be given the select criteria for the first as well as the second view. This recursively follows for the included third view etc. The code generation in step 504 thus recursively collects the select criteria for all the included views of a first view, to define the input parameters for this first view.

In contrast to the program code generation of step 504, an alternative embodiment of the invention may execute the data access operations without prior compilation. Such an embodiment may include an interpreter, that is, a sub-program for performing the data access operations resulting from step 503. Alternatively, an embodiment may provide the data access operations of step 503 in a format suitable for execution by an external interpreter, for example, included with a database management system.

Figure 1:
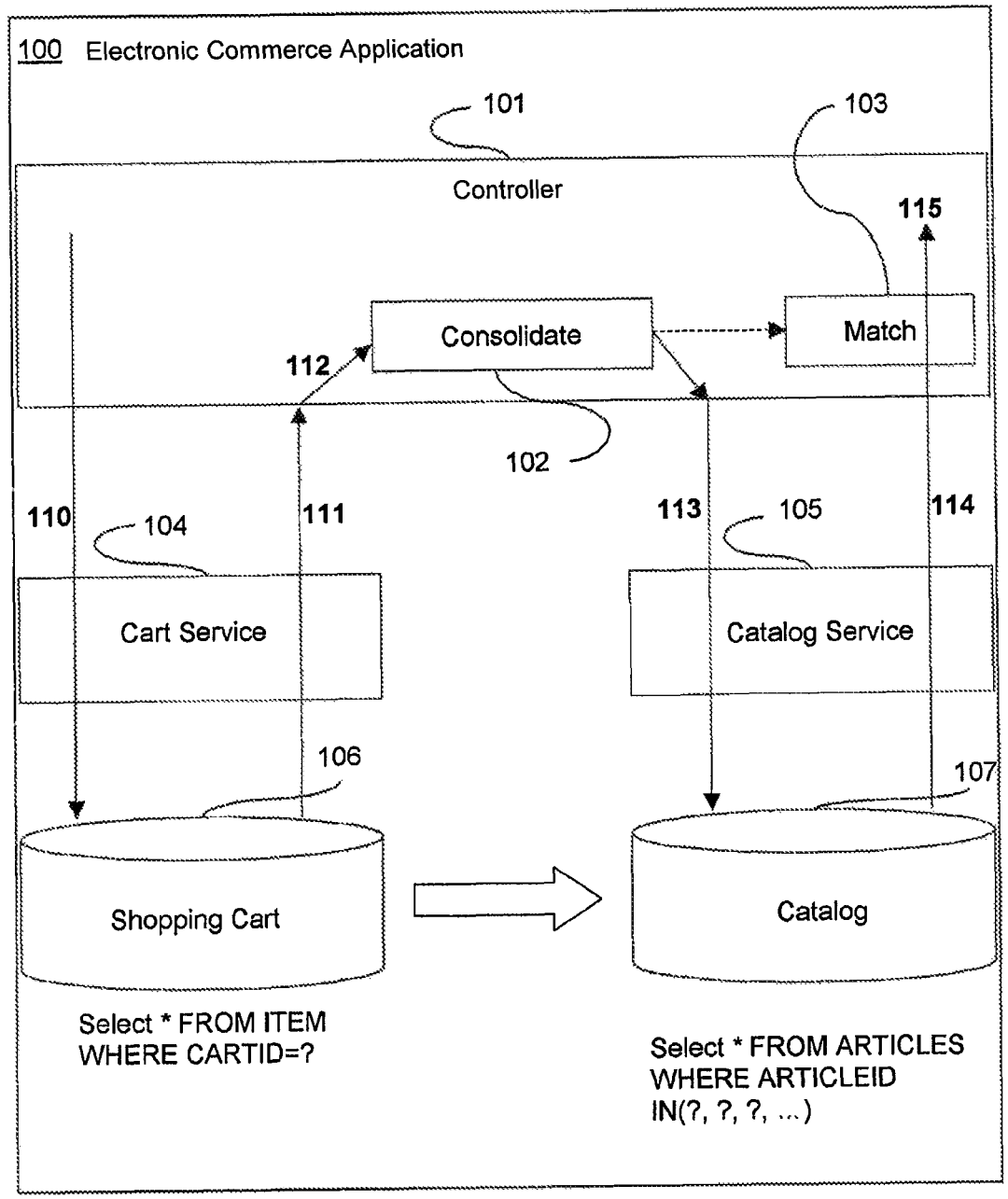
FIG. 1 shows, as an example, a block diagram of an electronic commerce application in accordance with a SOA.
Figure 2:
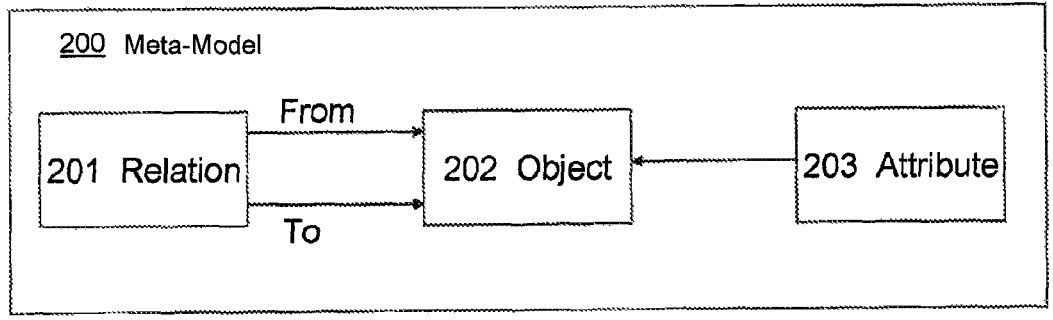
FIG. 2 shows, as an example, a conventional persistent data meta-model.
Figure 6:
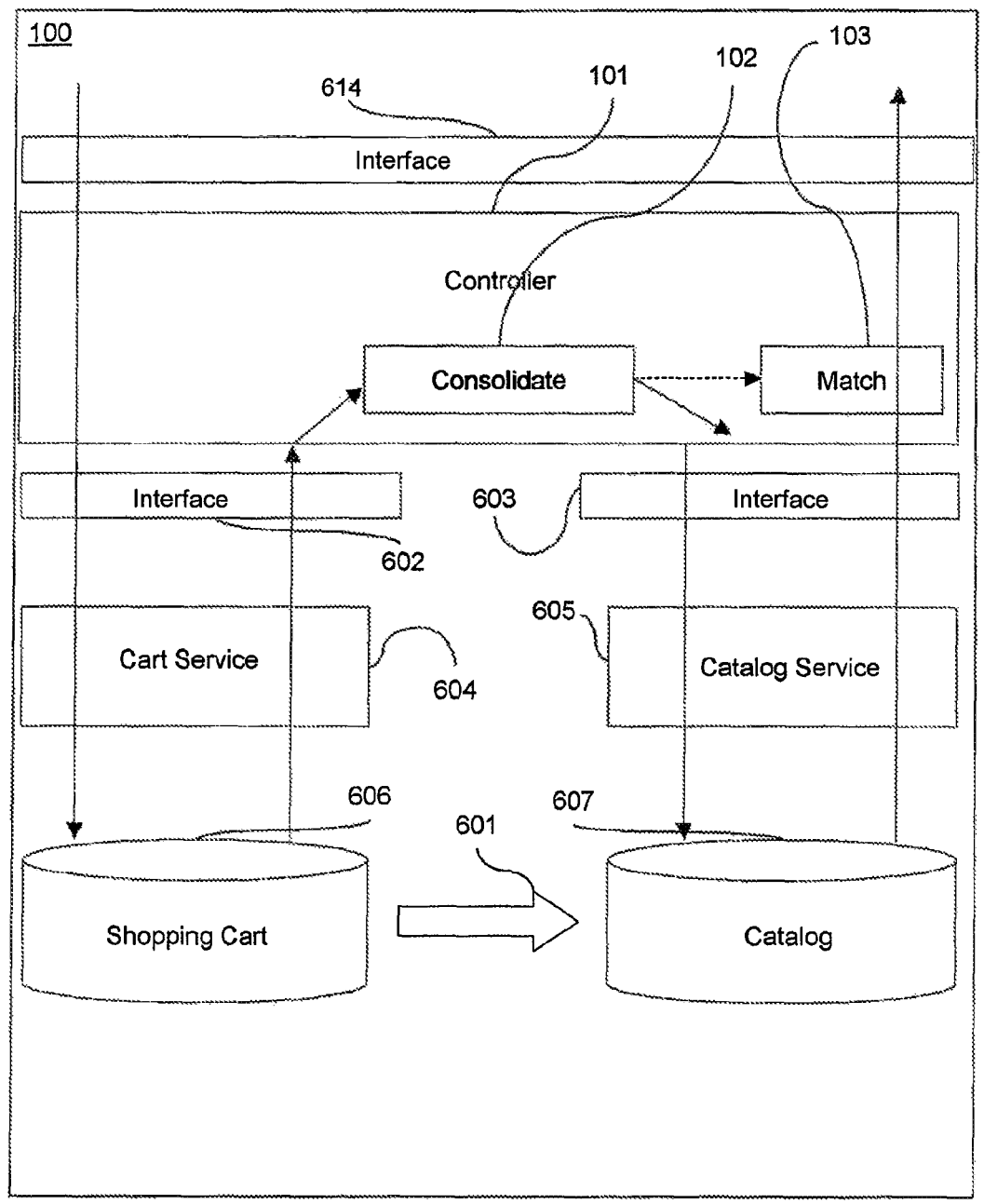
FIG. 6 shows, as an example, the block diagram of FIG. 1, further illustrating the storage and information service interfaces modeled by means of data services models according to the data services meta-model of FIG. 3, in accordance with an aspect of the present invention.

FIG. 6 shows the block diagram of FIG. 1, further illustrating the storage and information service interfaces modeled by means of the data services meta-model of FIG. 3. In particular, the data services model pertains to the relationships 601 between objects, the interfaces 602, 603 to access specific objects, and the interface 614 for composite transactions over multiple objects.

In prior art, the databases 106 and 107 (FIG. 1) may be modeled by a data model. In prior art, the interfaces 602, 603 and 614 (FIG. 6) may be modeled by services definitions. In prior art, the implementations of the services, 104, 105, and the controller 101 have to be implemented manually. Using the data services model described here, all artifacts shown in the diagram may be generated from the model in the code generation step 504 as described above. The data access operations, in this case, the views that are defined by the data services model allow to generate the service interfaces 602 and 603 as well as their implementations 104 and 105. The view relations as defined in the data services model allow generating the service interface 614 as well as its implementation 101. The consolidation step 102 and the matching step 103 can be generated from the view relations (in this case the knowledge that the cart view includes the article view).

An embodiment of the invention may use templates to generate from this data services model a data definition, i.e. a definition of the persistent data structures implied by the model. This data definition would typically be generated in a data definition language (DDL), such as SQL or XML Schema. An embodiment may further generate a set of data services for accessing objects of a single type, as well as a composite service that uses the single object services and consolidates the service operations into a single operation. These services may take the form of program code. In the process of code generation, an embodiment may create additional artifacts or byproducts. An example of such an artifact is a helper object for providing methods for accessing the persistent data using selection criteria defined by the model. For example, an embodiment may create a helper object for a view defined in the data services model. During code generation, the embodiment would then generate a call to the respective method provided by that helper object for each use of the view. If the view is related to further views by means of a view relation, the helper object may in turn be configured to call the respective helper objects of these further views upon invocation.

Figure 7:
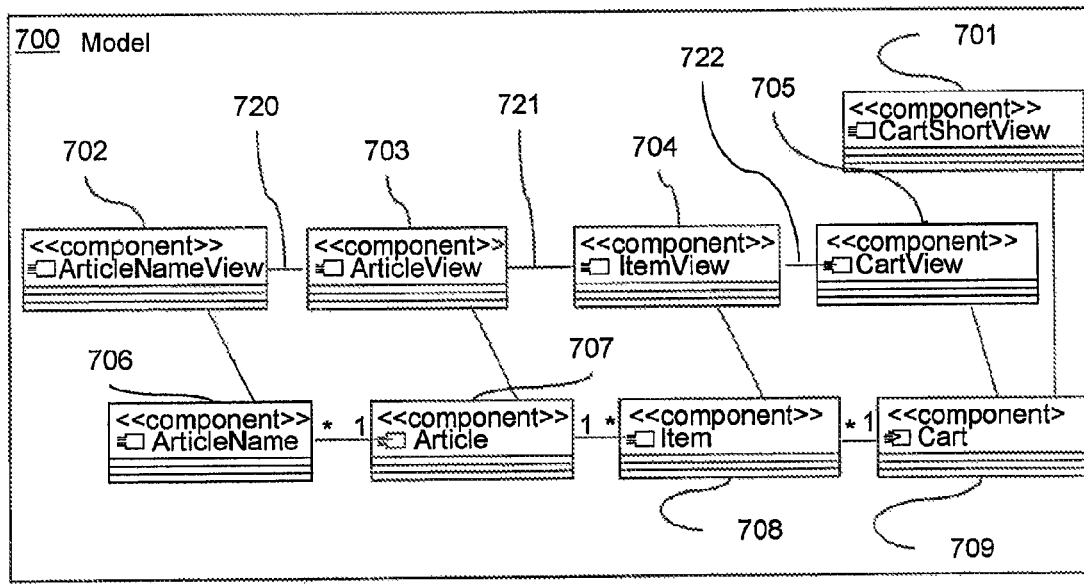
FIG. 7 shows, as an example, a further data services model according to an embodiment of the invention.

FIG. 7 shows, as an example, a data services model of an electronic commerce system, expressed using the Unified Modeling Language (UML). The model 700 comprises two main views 701, 705. When the system uses the view 701, for example, to access the contents of a virtual shopping cart, only the object 709 would typically be accessed. When the system uses the view 705, the view relations 720, 721, 722 would cause the views 702, 703, 704 to be included upon accessing the object 709.

The Item component 708 contains the information about a shopping cart item, e.g., its quantity, whereas the Article component 707 contains information about the article itself, like its colour or weight. The ArticleName component 706 contains the information about locale-specific article names (for example, the database table may contain two rows with an English name and a German name respectively). Here it is noted that the ArticleNameView 702 requires a selection criterion (input parameter) that defines the locale for which to retrieve the locale-specific article name. The code generation process 704 thus propagates that selection criterion recursively to the CartView 705, so that reading the CartView requires specifying the locale, allowing its use by the included ArticleNameView 702.

Figure 8:
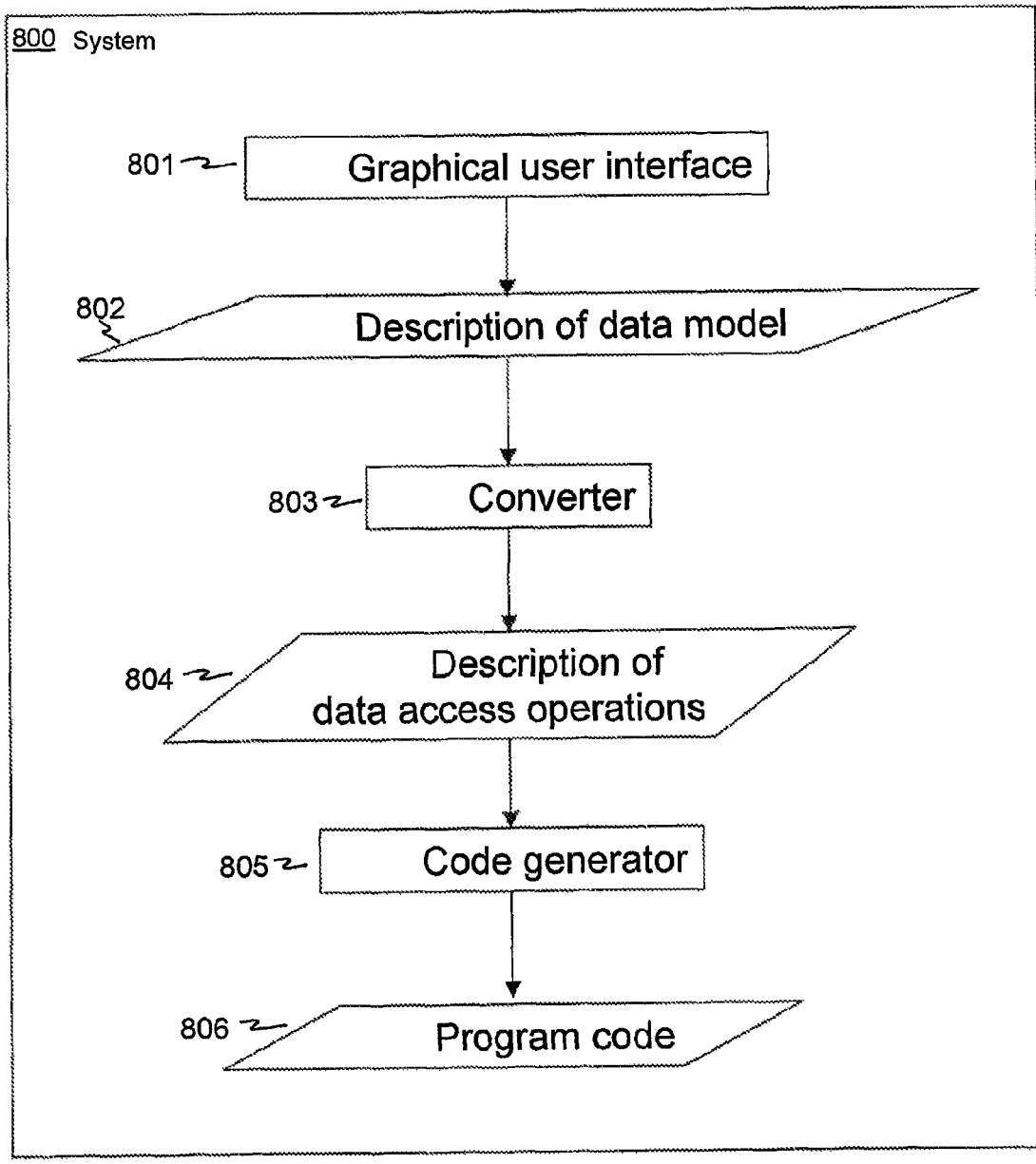
FIG. 8 shows, as an example, a block diagram of a system for carrying out a method according to an embodiment of the invention.

FIG. 8 shows, as an example, a block diagram of a system 800 for carrying out a method according to an embodiment of the invention. The system comprises an optional graphical user interface 801 for providing a description 802 of a data model. Alternatively, a textual representation may be used to describe the data model, for example, based on XML. The description 802 serves as input to a converter 803, which converts the transactions contained in the description 802 into data access operations 804. These data access operations 804 may in turn be taken as input by an optional code generator 805 to generate program code 806, for example, for execution on a specific target platform.

Figure 9:
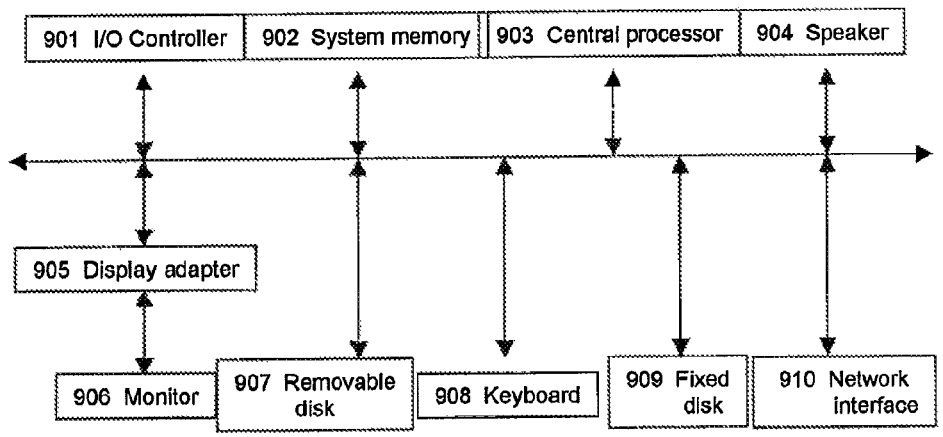
FIG. 9 shows a system block diagram of a typical computer system used to execute the software according to an embodiment of the present invention.

FIG. 9 shows a system block diagram of a typical computer system used to execute the software of an embodiment of the present invention. The computer system according to FIG. 9 may include monitor 906 and keyboard 908. The computer system further includes subsystems such as central processor 903, system memory 902, I/O controller 901, display adapter 905, removable disk 907 (e.g., CD-ROM drive), fixed disk 909, network interface 910, and speaker 904. Other computer systems suitable for use with embodiments of the present invention may include additional or fewer subsystems. For example, another computer system could include more than one processor 903 (i.e., a multi-processor system) or a cache memory.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is appreciated that although embodiments of the invention have been discussed on the assumption that SQL is used as a query language, this is not to be considered mandatory. It is possible to apply the same process to any query or data manipulation language such as Enterprise Java Bean Query Language/Java Persistence Query Language (EJB-QL), Object Query Language, or non-relational query languages.

It is appreciated that although embodiments of the invention have been discussed on the assumption that a database is used as a data store, this is not to be considered mandatory. It is possible to apply the same process to a variety of data stores such as enterprise resource planning systems, storage servers, or file systems.

This description explicitly describes some combinations of the various features discussed herein. It is appreciated that various other combinations are evident to a skilled person studying this description.

While the foregoing has been with reference to particular embodiments of the invention, it will be appreciated by those skilled in the art that changes in these embodiments may be made without departing from the principles of the appended claims.

What is claimed is:

1. A computerized method for generating data access operations based on a data model, the method comprising:
    receiving, by a processor, a description of said data model, said description including transactions on data objects and at least one interrelationship within said transactions; and
    converting, by the processor, said transactions on the data objects into data access operations in accordance with a protocol defined by a data store, said converting taking into account said at least one interrelationship, wherein the at least one interrelationship comprises at least one logical association between a first transaction and a second transaction of the transactions on the data objects, the at least one logical association defining a second data object to be retrieved by the second transaction based on retrieving a first data object by the first transaction, the first data object being different from the second data object, and wherein at least one data access operation of the data access operations is generated to retrieve the second data object based on the at least one logical association, and said converting further comprises optimizing the data access operations for the data store.

2. The method of claim 1, further comprising providing a set of allowable transactions for building said data model and a set of allowable interrelationships between said allowable transactions, and wherein said description includes selected allowable transactions from said set of allowable transactions and selected interrelationships between said selected allowable transactions from said set of allowable interrelationships.

3. The method of claim 2, wherein said set of allowable transactions comprises at least one of the following:
   a transaction for creating a data object in said data store;
   a transaction for reading a data object in said data store;
   a transaction for updating a data object in said data store; and
   a transaction for deleting a data object from said data store.

4. The method of claim 1, further comprising generating program code based on said data model and said data access operations, and wherein the at least one interrelationship comprises at least two interrelationships and wherein the generated program code follows the at least two interrelationships recursively to implement recursive relations of the at least two interrelationships.

5. The method of claim 1, wherein the optimizing said data access operations for said data store is based on at least one of the following:
   a measure of processing duration for at least one of said transactions; and
   a measure of workload imposed on said data store by at least one of said transactions.

6. The method of claim 1, further comprising generating a data definition expressed by means of a data definition language, said data definition based on at least one of the following:
   said data model; and
   said data access operations.

7. The method of claim 1, wherein said data store comprises at least one of the following:
   a relational database management system;
   a file containing Extensible Markup Language; and
   a resource described using the Resource Description Framework.

8. The method of claim 1, wherein said description is based on Extensible Markup Language.

9. The method of claim 1, wherein the logical association comprises a view relation of a first view, the view relation defining a second view to be retrieved upon retrieving the first view.

10. The method of claim 1, wherein the first data object and the second data object are stored on the data store, and wherein the data store comprises a computerized data store from which a hardware processor obtains the first data object and second data object.

11. A computer program product for generating data access operations based on a data model, the computer program product comprising:
   a non-transitory computer readable storage medium readable by a processor and storing instructions for execution by the processor for performing a method comprising:
      receiving a description of a data model, said description including transactions on data objects and at least one interrelationship within said transactions; and
      converting said transactions on the data objects into data access operations in accordance with a protocol defined by a data store, said converting taking into account said at least one interrelationship, wherein the at least one interrelationship comprises at least one logical association between a first transaction and a second transaction of the transactions on the data objects, the at least one logical association defining a second data object to be retrieved by the second transaction based on retrieving a first data object by the first transaction, the first data object being different from the second data object, and wherein at least one data access operation of the data access operations is generated to retrieve the second data object based on the at least one logical association, and said converting further comprises optimizing the data access operations for the data store.

12. The computer program product of claim 11, wherein the method further comprises generating program code based on said data model and said data access operations, and wherein the at least one interrelationship comprises at least two interrelationships and wherein the generated program code follows the at least two interrelationships recursively to implement recursive relations of the at least two interrelationships.

13. The computer program product of claim 11, wherein said method further comprises providing a set of allowable transactions for building said data model and a set of allowable interrelationships between said allowable transactions, and wherein said description includes selected allowable transactions from said set of allowable transactions and selected interrelationships between said selected allowable transactions from said set of allowable interrelationships.

14. The computer program product of claim 11, wherein said optimizing said data access operations for said data store is based on at least one of the following:
   a measure of processing duration for at least one of said transactions; and
   a measure of workload imposed on said data store by at least one of said transactions.

15. The computer program product of claim 11, wherein said method further comprises generating a data definition expressed by means of a data definition language, said data definition based on at least one of the following:
   said data model; and
   said data access operations.

16. A computer system for generating program code from a data model, said computer system comprising:
   a memory; and
   a processor in communications with the memory, wherein the computer system is configured to perform a method, said method comprising:
      storing a description of said data model, said description including transactions on data objects and at least one interrelationship within said transactions; and
      converting said transactions on the data objects into data access operations in accordance with a protocol defined by a data store, said converting being responsive to said at least one interrelationship, wherein the at least one interrelationship comprises at least one logical association between a first transaction and a second transaction of the transactions on the data objects, the at least one logical association defining a second data object to be retrieved by the second transaction based on retrieving a first data object by the first transaction, the first data being different from the second data object, and wherein at least one data access operation of the data access operations is generated to retrieve the second data object based on the at least one logical association, and said converting further comprises optimizing the data access operations for the data store.

17. The computer system of claim 16, wherein said data store comprises at least one of the following:
   a relational database management system;
   a file containing Extensible Markup Language; and
   a resource described using the Resource Description Framework.

18. The computer system of claim 16, further comprising a code generator to generate program code based on the data model and the data access operations, and wherein the at least one interrelationship comprises at least two interrelationships and wherein the generated program code follows the at least two interrelationships recursively to implement recursive relations of the at least two interrelationships.

19. The computer system of claim 16, wherein said description comprises selected allowable transactions from a set of allowable transactions for building said data model and selected interrelationships between said selected allowable transactions from a set of allowable interrelationships between said allowable transactions.

20. A method of deploying logic on a computer system to generate data access operations, the method comprising:
   installing logic on the computer system, the computer system to receive a description of said data model, said description including transactions on data objects and at least one interrelationship within said transactions, and to convert said transactions on the data objects into data access operations in accordance with a protocol defined by a data store, said converting taking into account said at least one interrelationship, wherein the at least one interrelationship comprises at least one logical association between a first transaction and a second transaction of the transactions on the data objects, the at least one logical association defining a second data object to be retrieved by the second transaction based on retrieving a first data object by the first transaction, the first data object being different from the second data object, and wherein at least one data access operation of the data access operations is generated to retrieve the second data object based on the at least one logical association, and said converting further optimizing the data access operations for the data store.

* * * * *